United States Patent [19]

Wu et al.

[11] Patent Number: 5,776,425
[45] Date of Patent: Jul. 7, 1998

[54] METHOD FOR PREPARING POROUS TIN OXIDE MONOLITH WITH HIGH SPECIFIC SURFACE AREA AND CONTROLLED DEGREE OF TRANSPARENCY

[75] Inventors: Lih-Fu Wu, Jwu-Beei City; Nae-Lih Wu, Yeong--Her City, both of Taiwan

[73] Assignee: National Science Council, Taipei, Taiwan

[21] Appl. No.: 431,069

[22] Filed: Apr. 26, 1995

[51] Int. Cl.$^6$ ............................................. C01G 19/02
[52] U.S. Cl. ........................................... 423/618; 502/352
[58] Field of Search ........................... 423/618; 502/352

[56] References Cited

U.S. PATENT DOCUMENTS

| | | | |
|---|---|---|---|
| 1,682,240 | 8/1928 | Patrick | 423/618 |
| 1,879,022 | 9/1932 | Barclay | 502/352 |
| 5,330,833 | 7/1994 | Yamashita et al. | 423/618 |

FOREIGN PATENT DOCUMENTS

| | | | |
|---|---|---|---|
| 4-352807 | 12/1992 | Japan | 423/618 |
| 508479 | 5/1973 | U.S.S.R. | 423/618 |

OTHER PUBLICATIONS

Chemical Abstract 117: 51781x. "Preparation of Silica–MxOy Thin Films and Gels... Metal Halides", Aug./1992.

*Primary Examiner*—Ngoc-Yen Nguyen
*Attorney, Agent, or Firm*—W. Wayne Liauh

[57] ABSTRACT

A process for preparing high specific surface area and small pore size tin oxide monolith is disclosed. It includes the steps of: (a) dissolving tin chloride or its hydrate in alcohol to form an alcohol solution having a tin ion concentration ranging between 0.001 to 5.0M, and then mixing the alcohol solution with water to make a tin-alcohol-water mixture solution, wherein the moral ratio between water and tin ion ranges between 3,500:1 and 100:1; (b) settling the tin-alcohol-water mixture solution until a colloid or flocculent-type gel is formed and settles to the bottom of the mixture solution to form sediments; (c) removing the mixture solution above the sediments, then adding fresh water or fresh water/alcohol mixture to the sediments to thereby increase the solution pH without the use of any alkaline solution; (d) repeating steps b and c until the solution pH of the mixture solution reaches a predetermined value; (e) collecting and drying the sediments, which become gel-like sediments, to obtain a tin oxide monolith; and (f) heat-treating the tin oxide monolith obtained from step (e) to obtain heat-treated tin oxide monolith.

12 Claims, 3 Drawing Sheets

METHOD FOR PREPARING POROUS TIN OXIDE MONOLITH WITH HIGH SPECIFIC SURFACE AREA AND CONTROLLED DEGREE OF TRANSPARENCY

BACKGROUND OF THE INVENTION

Tin oxide is a material of versatile applications. For example, tin oxide, with or without containing other metals or oxides, has been employed as a catalyst for oxidation of organics, as shown in the cases disclosed in U.S. Pat. Nos. 4,701,437 and 3,947,474. In addition, U.S. Pat. No. 5,051,393 disclosed the use of tin oxide as a catalyst for the automobile exhaust control. U.S. Pat. No 4,855,274 disclosed the use of tin oxide as a catalyst for the recombination of carbon monoxide and oxygen in a carbon dioxide laser generator. As a general rule in catalysis, it is preferable to increase the surface area per unit weight, i.e., the specific surface area, of a catalyst exposed to the reactants. For a porous bulk material, the total effective surface area is the sum of the internal and external surface areas with the internal one being predominant.

Tin oxide, with or without containing other metals or oxides, has also been employed as a gas-sensing material. For example, U.S. Pat. No. 4,592,967 disclosed a method for the measurement of gas concentration by measuring the change in conductivity of tin oxide when the gas passed through the oxide surface and reacted with the species originally adsorbed on the tin oxide surface. U.S. Pat. No. 5,185,130 disclosed the preparation method of tin-oxide thin film for gas sensor, which was formed by vacuum-depositing tin alloy containing 5 wt % bismuth on aluminum oxide support and subsequently oxidizing the film to form tin oxide. A. Grisel et al. disclosed a tin-oxide-film sensor containing palladium(Pd), which was prepared by sputtering method. (see Chem. Sen. Tech., 2, 1989.) The sensor has been shown to be capable of detecting carbon monoxide, liquefied natural gas, alcohols, and many other reducing gases. Since the applications of tin oxide to be a gas sensor also involves the reaction of the gas phase species and the adsorbed species on the oxide surface, increasing the specific surface area of tin oxide is known to effectively increase the sensitivity of the gas sensor. This is a subject that has been one of the primary research topics in the preparation technology of semiconductor, such as tin oxide, -based gas-sensors.

In addition, due to its high conductivity, tin oxide has been used to make transparent conductive glass. Furthermore, due to its high reflectivity to infrared light, tin oxide has also been used in forming heat mirror (see Thin solid films, 90,297–308(1977)). For these applications, tin oxide is typically prepared in the thin-film form.

There are currently two general approaches for making bulk porous tin oxide. In the first approach, the powder process, the bulk tin oxide is prepared via a process consisting of sequential steps of powder synthesis, molding, and sintering. The tin oxide powder has been prepared either by oxidizing tin metal or by precipitating tin out of the solution of its salt, followed by decomposition and oxidation of the precipitates at high temperatures. The metallic salt solution may or may not contain, in addition to tin ion, other metallic ions, such as copper, platinum, tungsten, molybdenum, chromium and antimony. Precipitation is typically carried out by adding either ammonia water, urea or other organic amines, or compounds containing organic anions, such as oxalate, carbonate and citrate, that form insoluble solids with tin and other metal cations, into the solution to simultaneously precipitate tin and other metal ions. The precipitate is then decomposed and oxidized to form tin oxide powder. The tin oxide powder is then molded and sintered at high temperatures at form a bulk material.

By following this approach, Giesekke et al. disclosed a process for the preparation of bulk porous tin oxide (see Inorganic chemistry, 6, 1294–1297 (1967)). In this process, equal volume of 2M $SnCl_4$ (tin tetrachloride) solution and $NH_4OH$ (ammonia water) was mixed with rapid agitation to obtain precipitate containing tin. After being thoroughly washed with a large quantity of distilled water to remove excess chlorine anion($Cl^-$) and ammonium cation($NH_4^+$), the precipitate was then stored in water. After 30 days, the solution turned into gel, which was then forced to sediment by centrifuge. The sediment was sequentially dried at 110° C. and then at 600° C. to obtain tin oxide powder. The powder was molded and sintered to obtain a bulk tin oxide.

M. J. Fuller et al. disclosed another similar process for the preparation of tin oxide powder (see J. of Catalysis, 29, 441–50 (1973)). The process involved firstly addition of concentrated ammonia into a water solution of 0.6M tin tetrachloride to obtain precipitate. The precipitate was sedimented and redispersed in distilled water. The procedures were repeated twice. The final precipitate was washed several times with 1M nitric acid and then by water. The washed sediment was finally dried in air at 200° C. to obtain tin oxide powder.

Tan et al. disclosed a process for the preparation of mixture powder containing tin and molybdenum oxides (Sn-Mo-O) (see J. of Catalysis, 17, 132–142(1970)). In their process, ammonia water was added into a water solution of tin tetrachloride to obtain tin hydroxide precipitate, which was then dispersed in the water solution of molybdenum ammonia. The binary oxide powder was finally obtained by drying the solution. Sala et al. disclosed a process for the preparation of Sn-Sb-O powder (see J. of Catalysis, 34, 68–78 (1974)). In this process, ammonia water was added the water solution of tin chloride and antimony chloride to obtain mixture precipitate of tin hydroxide and antimony hydroxide, which was then dried.

Because of the requirement of high-temperature (no lower than 600° C.) treatment employed in the sintering step of the powder method, the tin oxide bulks thus produced contain large and non-uniform pore sizes, very low specific surface area (typically no more than a few tens $m^2/g$) and poor transparency. Due to the small specific surface area, the tin oxide grains can not contact effectively with the reactive gases or the gases to be detected in the catalysis and gas-sensor applications, respectively. This results in a low catalytic activity and poor gas-sensing sensitivity. Moreover, the poor transparency also excludes its usage in most optical applications.

In the second preparation approach, the gel process, bulk tin oxide is directly formed from gel precursor without going through the powder-making and sintering steps as employed in the powder method. The bulk prepared via this approach is generally termed as monolith. As exercised in the known preparation technologies, the gel precursor was made by adding base agents, such as ammonia water and organic amines, into an originally acidic tin tetrachloride solution to change the solution from being acidic to basic, where tin is precipitated as hydroxide. After steps of cleaning, using washing or dialyzed . . . , to remove undesired cations or anions, the precipitate was then redispersed in water to form solution and then gel. The gel precursor was finally slowly dried to form a solid bulk tin oxide. In general, because of the omission of the higher-temperature sintering step, much smaller pore sizes and a much higher specific surface area of the tin oxide bulk can be achieved by the gel process than by the powder process.

Presecatan et al. disclosed a process, that is typical of the previous arts, for preparing tin oxide monolith via the gel process (see J. Non-crystalline Solids, 147&148, 340–345 (1992)). In his process, excess ammonia water was added into tin chloride solution with vigorous agitation until a final solution pH=11 was reached. White precipitate was formed during and after this titration period. Dialysis followed by repeated washing of the precipitate with clean water was then carried out to remove ammonium and chloride ions. The precipitate was then redispersed and settled in water. By graduate heating to evaporate water, sol was first formed in the solution and, when the sol reached certain critical concentration, the solution turned into gel. The gel was then dried slowly at room temperature in air to finally become a bulk monolith. The transparency of the monolith thus prepared by the method was not characterized, but its specific area was reported to be 110–170 $m^2/g$ with an average crystal grain size of 13 nm.

The microstructure, and hence the specific surface area, of a tin oxide monolith prepared by the basic gel method is known to depend heavily on the preparation procedures. In particular, the addition of a basic agent into the solution of tetrachloride unavoidably cause spots of extremely high pH values in the solution. This typically results in producing agglomerate precipitate, in which chloride ion($Cl^-$) or ammonium ion($NH_4^+$) were trapped and in prolonged cleaning procedures to remove these ions. To minimize such an effect, the basic reagent, such as ammonia, is often added very slowly and with vigorous agitation.

It has been reported that the presence of chlorine and, particularly, ammonium ions could delay gelation and hence has to be removed away. This is often carried out either by a long period, for instance, several weeks or even up to three months, of washing with water or by employing dialysis method, which is of high-cost and still requires more than a week of operation time.

SUMMARY OF THE INVENTION

Because porous tin oxide monolith is a material of versatile applications and because the previous preparation technologies have many disadvantages, the invention discloses a completely new gel process which is based on the acidic-gel approach, as in contrast to the conventional basic-gel route. The invention disclose a gel method requiring no addition of any alkaline agent to cause gelation. In addition, the process does not require formation of tin hydroxy precipitate prior to the gel formation. The omission of the addition of any alkaline agent greatly reduces the amount of undesired cation or anion species in the gel precursor and hence simplifies the cleaning procedures for removing these ions. Hence, the total processing time for obtaining the monolith bulk is greatly shortened and the process does not require the use of dialysis technique, as compared with the previous basic-gel process. The tin oxide monolith prepared by the invention has a higher specific surface area, 180–250 $m^2/g$, smaller pore sizes, 2.2–4.6 nm, and a higher degree of transparency than those reported in the previous basic-gel processes. The invention uses tin chloride or its hydrate, alcohols and water as the only processing materials, which react under the acidic condition (pH<7) to form the gel precursor. Porous tin oxide monolith is then obtained by slowly drying the gel. The bulk products produced by the invention can be applied to catalyst, gas sensor and photoelectric device for higher effectiveness as well as an ultrafilter. For the latter, as compared with the traditional polymer filter, the porous tin oxide filter has the following advantages: (1) it can be used at much higher temperatures; (2) it does not expand or shrink while contacting organic solvents; and (3) it possesses much higher we arability than polymer.

The invention "the preparation method for porous tin oxide monolith" comprises the steps of the preparation of the alcohol/water solution of tin chloride or its hydrate and the subsequent adjustments of pH by using pure water or alcohol/water mixture. The first step in the process of the invention is to prepare the alcohol/water solution of tin chloride or its hydrate, i.e., to first dissolve tin chloride or its hydrate in alcohol and, after complete dissolution, mix the solution with different amounts of water. After a period of settling, during which colloids or flocculent-type gel are continuously formed and sediments to the bottom of the solution, the top portion of the clean solution is discarded and more water or alcohol/water mixture is added. The same settling-decanting-water adding procedures are repeated several times until the pH value of the solution reaches the range of pH=2.0–7.0, after which the sedimented gel is collected, filtered to remove excess water and/or alcohol and placed in a container made of Teflon or PE for slowly drying. The drying rate is controlled by adjusting the ambient relative humidity and temperature. After drying, the gel turns into a solid transparent solid tin oxide monolith. The degree of transparency of the monolith varies with the pH value at which the gel is set for drying. In general, the lower the pH value, the higher the degree of transparency of the monolith. The solid xerogel can be further heat-treated at higher temperatures (>100° C.) for improving its mechanical strength or tailoring its pore structure.

Thus, the invention "the preparation method for porous oxide monolith" disclosed here comprises the following procedures:

a. Dissolve tin chloride or its hydrate in alcohol and then mix this stock alcohol solution with different amounts of water to make solutions with different starting tin contents and pH values. The ratio of alcohol solution to the added water is specified by the molar ratio of water to tin.

b. settle the mixed solution until colloid or flocculent-type gel is formed and sediments to the bottom of the solution. Then, remove the solution above the sediment, add fresh water or water/alcohol mixture, and settle the solution.

c. repeat the step b several times, during which the pH value of the solution increases slowly.

d. After the PH value of the solution reaches the desired value, collect the gel sediment and dry it slowly to become solid tin oxide monolith.

e. the monolith is heat treated to tailor its properties, such as degree of transparency, pore size distribution, specific surface area and mechanical strength.

Tin oxide film can also be formed by rapidly agitating the gel-containing solution to obtain uniform gel suspension and then using the known liquid coating technologies, such as dipping, spray pyrolysis or spin coating, for coating tin oxide gel on a smooth substrate made of either glass, aluminum oxide or other materials. The gel film is then slowly dried to obtain porous tin oxide film. When necessary, the film can be further heat treated as in the case of making the bulk monolith. Repeat the coating and heating procedures to obtain a thicker film.

In addition, one may also add other metal cations during the procedure for making the monolith bulk or film.

The tin chloride or its hydrate mentioned in the invention is anhydrous tin tetrachloride ($SnCl_4$) or its Hydrate ($SnCl_4 \cdot nH_2O$). The latter is preferable because the hydrate is less volatile than the anhydrous one. The alcohols can be methanol, ethanol, n-propanol, isopropyl alcohol, t-butyl alcohol, or any other alcohols which have high mutual solubility with water at room temperature. The alcohol solution of tin tetrachloride is prepared by dissolving them in alcohol with a tin tetrachloride concentration in the range of 0.001–5.0M. The amount of water to be added into the alcohol solution is specified by the molar ratio of water to tin ion. Usually the molar ratio of water to tin ion is within the range of 3500:1 to 100:1, and the preferred range is 1500:1 to 400:1.

Repeating the procedures of settling, extraction of the solution above the sediment and addition of fresh water or alcohol/water mixture is, on the one hand, to adjust the pH value and, on the other hand, to reduce the amount of chlorine anion in the solution. During these procedures, the pH value of the solution gradually increases. The total number of the repeating cycles depends on the desired pH at which the gel sediment is to be dried. The final heat treatment of the monolith is preferably carried out by a multi-step scheme in which the temperature is increased by a small increment each time. The highest sintering temperature is preferably no higher than 400° C., at which the heated monolith can gain significant improvment in mechanical strength while maintaining its high specific surface area. Significant loss (approximately 50%) in specific surface area is noted for heating at 500° C. for 1 hr.

The applications of thus prepared porous tin oxide monolith bulks and films can be greatly extended by the addition of other metals or their oxides. These metals can be selected from one or several of those, such as platinum, copper, chromium, antimony, yttrium, palladium, gold, aluminum, nickel, cesium, iron and calcium, of which alcohol or water-soluble salts can be found. These metals or their oxides can be introduced into the tin oxide samples by either one of the following two preparation approaches. Firstly, alcohol soluble salts of these mteals are added into the starting alcohol solution of tin tetrachloridehe. Secondly, one may dip the already solidified tin oxide monolith to the alcohol or water solution of these metal salts then dry the monolith.

Therefore, in the above mentioned processes, the added one or several metal components are selected from platinum, copper, chromium, antimony, yttrium, palladium, gold, aluminum, nickel, cesium, iron, calcium, tungsten, molybdenum etc., and the said alcohol or water soluable salts can be selected from antimony chloride, chromium oxide, copper nitrate, palladium chloride, platinum chloride, yttrium chloride, aluminum chloride, gold chloride, ferric chloride, nickel chloride, cesium chloride and calcium chloride. The added quantity will make the molar ratio of tin ion to the added metal ion in the range of 1:0.005–1:0.1 in the final gel. The preferred quantity is dependent on application.

The formulation of the invention consisting of tin chloride, alcohol and water, wherein tin chloride means either anhydrous tin chloride or its hydrate ($SnCl_4 \cdot nH_2O$). The preferred liquid alcohols include methanol, ethanol, n-propanol, isopropyl alcohol, and t-butyl alcohols. Tin tetrachloride is dissolved in any of these alcohols to make a starting solution with a tin ion concentration within the range of 0.001M to 5.0M. The amount of water added into the alcohol solution is determined based on the molar ratio of the water content to tin ion($Sn_4+$). The ratio is usually within the range of 3500:1–100:1, and the preferred is 1500:1–400:1.

Table 1 lists the specific surface areas, measured by using BET method and nitrogen as the measuring gas, of two monolith tin oxide xerogels prepared according to the invention "the preparation method for porous tin oxide monolith".

TABLE (1)

|  | example 1 | example 2 |
| --- | --- | --- |
| specific surface area of tin oxide xerogel | 187 $m^2/g$ | 245 $m^2/g$ |

In addition, the transparency of the porous tin oxide prepared according to the invention was measured by using ultra violet/visible & near-infrared spectroscopy, which shows, for example, the sample 1 appearing in Table (1) to have a transmittance of 93% in the visible light wavelength range of 400–700 nm. This sample has a thickness of 2.6 mm, which translates into an absorption coefficient of 0.2791 $cm^{-1}$.

In order to evaluate the catalytic effect of the tin oxide prepared by the inventionn, the example—2 sample appearing in Table(1) was first heat-treated at 350° C. for 2 hours and then used as a catalyst for CO oxidation. The reaction conditions are as follows:

(1) reacting gases containing 5.0 v/v % CO and 95 v/v % air;

(2) a total flow rate of 80 cm $^3$/min-gram tin oxide; and (3) a constant reaction temperature at 200° C.

The obtained CO conversion is 99.1%. This value is much higher than those obtained by using tin oxide catalyst prepared by the previous technologies. For example, M. J. Fuller et al. (see J. of Catalysis, 29, 441–50(1970)) prepared tin oxide powder catalyst by first adding concentrate ammonia water to 0.6M tin tetrachloride water solution ahd then drying the precipitate to obtain tin oxide powder. As they used these powders as a catalyst for CO oxidation under the reaction conditions of (1') reacting gases containing 5.5 v/v % CO and 94.5 v/v % air;

(2') a total flow rate of 90 cm3/min-gram tin oxide; and (3') a constant reaction temperature at 200° C.;

which are very similar to the conditions (1) through (3), a CO conversion of only 50% was achieved.

To demonstrate the applications of the tin oxide monolith prepared by the invention to be a gas sensor, the example-2 sample was dipped into a water solution of 0.01M palladium chloride for 4 hours, followed by heat treatment at 350° C. for 1 hr. The gas sensing ability of this sample was tested in a CO-air mixture, which contains 200 ppm CO, at 180° C. The sensisitivity of a gas sensor is conventionally defined as Sensitivity=Ra/Rc where Ra is the electric resistivity when pure air flows through, and Rc, the electric resistivity when the air containing carbon monoxide flow through. As shown in FIG. 2, the Pd-containing example 2 tin oxide gives a sensitivity of 2.9.

In another example, a porous tin oxide monolith film prepared by the invention (example 15) was dipped in a water solution of 0.01M palladium water solution for 30 minutes, then heated 30 minutes at 350° C. for 3 hours. At 150° C. and 200 ppm CO in air, this sample shows a sensitivity of 3.7, as shown in FIG. 3.

Comparatively, US patent disclose a tin oxide thin film sensor containing 5 wt % bismuth to show sensitivities, toward 1,000 ppm carbon monoxide, of 4.2 at 440 C. but no response, i.e. sensitivity=1.0, at temperatures below 360° C. In another example, A. Grisel et al. (see Chem. Sen. Tech., 2, 1989) disclose a CO sensor based on the Pd-containing tin oxide film prepared by sputtering methond. This film exhibited a sensitivity, at 380° C., of 3.4 toward 200 ppm CO. As noted, in order to achieve similar sensitivities, both previous disclosures have to use the sensor operation temperatures, 440° and 380° C., that are much higher than that (no higher than 180° C.) of the sensor prepared by the invention.

DETAILED DESCRIPTION OF PREFERRED EMBODIMENTS

Figure 1:
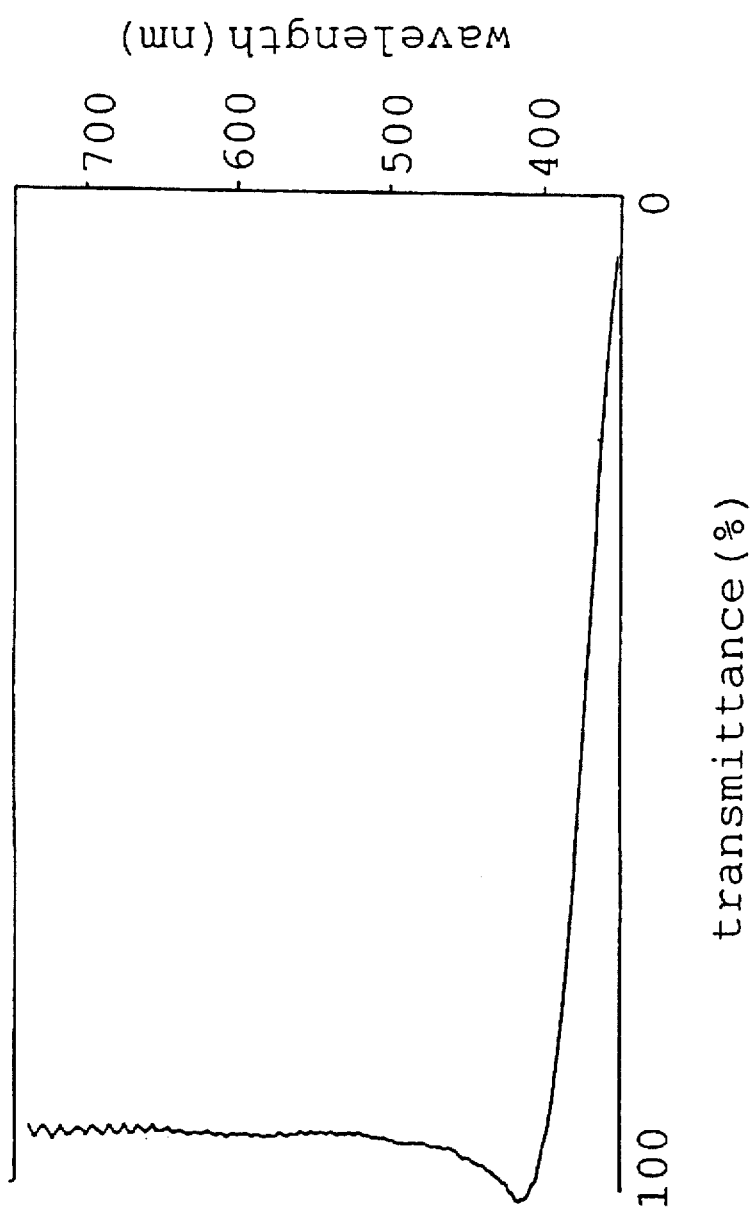
FIG. 1 is a plot showing the transmittance spectrum of ultraviolet/visible/near infrared lights of tin oxide monolith prepared according to a preferred embodiment of the present invention.
Figure 2:
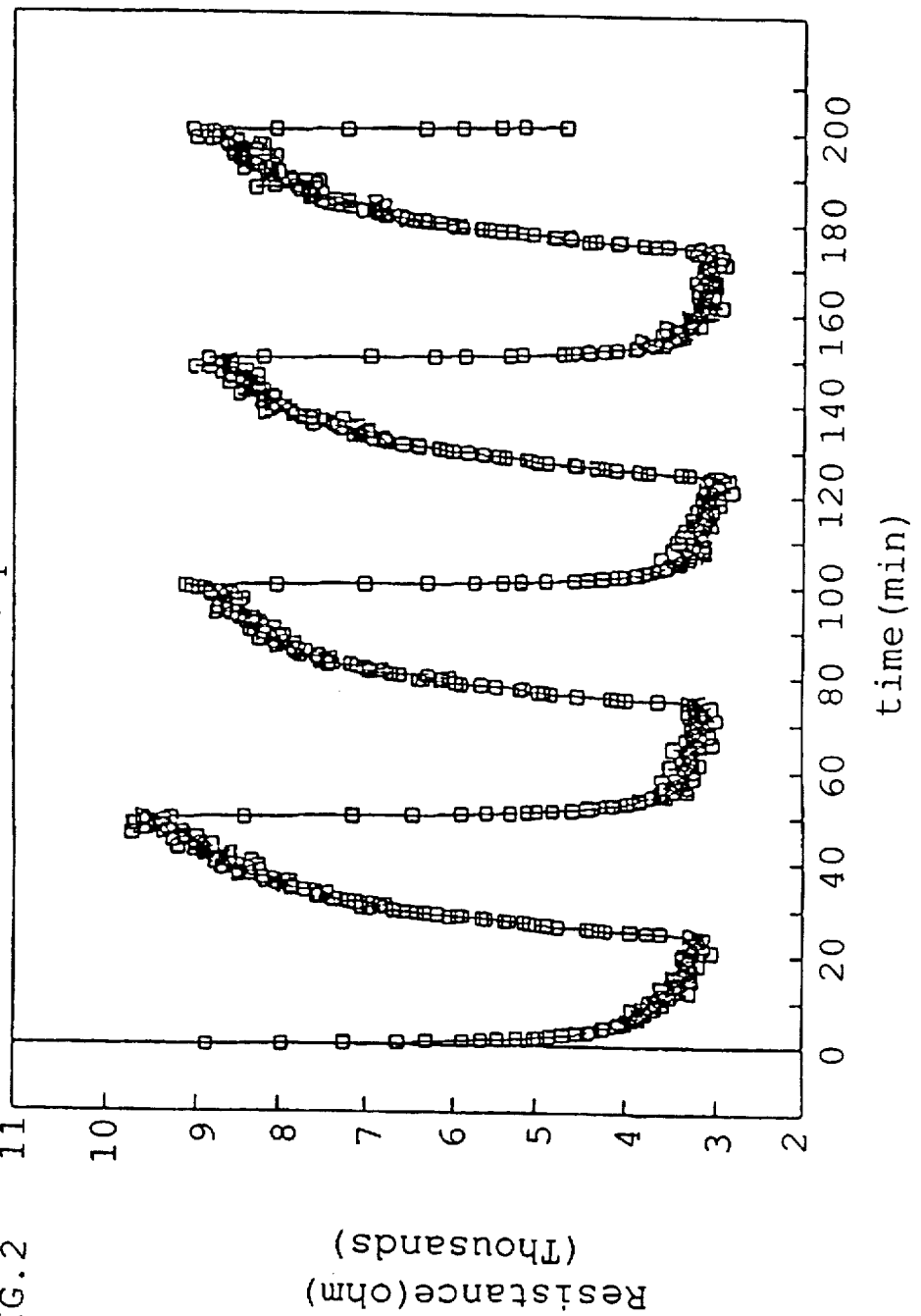
FIG. 2 is a plot showing the sensitivity of a gas sensor made of porous tin oxide monolith prepared in the present invention.
Figure 3:
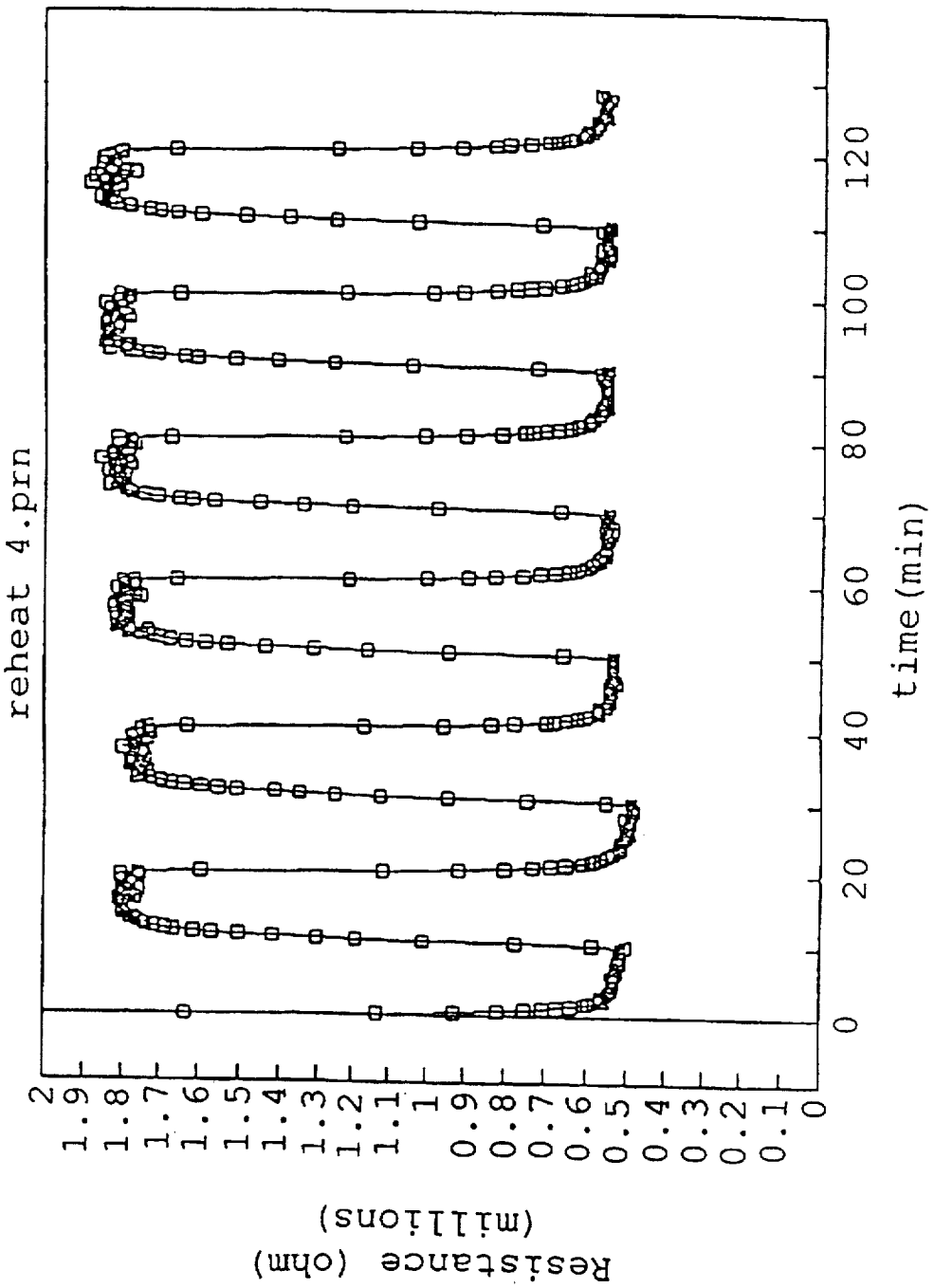
FIG. 3 is a plot showing the sensitivity of a gas sensor made of porous tin oxide film prepared in the present invention.

The following examples are for the description of the invention in detail but are not to be considered limiting.

EXAMPLE 1

Dissolve 17.5 g of tin tetrachloride hydrate ($SnCl_4 \cdot nH_2O$) in 250 ml ethanol. After complete dissolution, add 2,250 ml water. The pH value of this alcohol-water solution is 1.1. Tightly seal the container and settle the solution at 25° C. for 24 hours, during which flocculent-type gel is formed and sediments to the bottom of the solution. Then, discard the top portion of clean solution but not to disturb the sedimented gel. Again add 2,000 ml distilled water, cover and seal the container and settle the solution for 8 hours. Repeat the former (solution decanting-water adding-settling) procedures three times to give a solution of which the PH is 2.2. Take 50 ml of the sedimented gel and pour it into a cylindrical PE bottle with 4.5 cm diameter. Dry the gel at 25° C. and 75% relative humidity for 15 days to obtain a monolith with 1 cm diameter and 0.7 cm height. As listed in Table 1, the xerogel has a specific surface area of 187 $m^2/g$.

EXAMPLE 2

Follow the procedures in example 1 except that the (solution decanting-water adding-settling) procedures was carried out for 9 times to obtain a solution with pH=4.3. The specific surface area of the obtained tin oxide monolith, as listed in Table 1, is 245 m2/g.

EXAMPLE 3

Heat treat the example-2 monolith from 25° C. to 50° C. at a heating rate of 1.5° C./hr, further to 100° C. at 2.0° C./hr, to 200° C. at 3.0° C./hr, to 300° C. at 4.0° C./hr and to 350° C. at 5.0° C./hr, and finally keep the sample at 350° C. for 10 hours to obtain a dried, transparent, yellowish tin oxide monolith.

EXAMPLE 4

Follow the method of example 2 except that 1.66 g chromium oxide ($CrO_3$) and 4 g copper nitrate ($Cu(NO_3)_2 \cdot 3H_2O$) was dissolved in the 50 ml gel sample immediately prior to the drying step. The chromium and copper-containing tin oxide monolith was then heat-treat by following the thermal history in example 3 to obtain porous mixed oxide monolith containing tin—chromium—copper (Sn-Cr-Cu).

EXAMPLES 5–12

Follow the procedures in example 2 except that water solution containing either 0.65 g yttrium chloride ($YCl_3$), 0.45 g aluminium chloride ($AlCl_3$), 0.06 g palladium chloride ($PdCl_3$), 0.1 g gold chloride ($AuCl_3$), 1.1 g ferric chloride ($FeCl_3$), 0.9 g nickel chloride ($NiCl_2$), 0.1 g Cesium chloride (CsCl) or 0.07 g calcium chloride ($CaCl_2$) was added into the 50 ml gel sample immediately prior to the drying step. The added amounts make the molar ratio of $Sn^+_4$ to the added metal cation ($M^+$) in the gel range from 1:0.005 to 1:0.1. After slow drying to obtain monolith, heat—treat the monolith in a manner similar to that in example 3 to obtain binary porous mixed—oxide monoliths containing tin and the added metal.

EXAMPLE 13

Dissolve 10 g chromium oxide ($CrO_3$) and 30.37 g copper nitrate ($Cu(NO_3)_2 \cdot 3H_2O$) in 100 ml water, then dip the tin oxide monolith of example 3 into the solution for 1 hr. Take it out and dry it first at 100° C. and then at 350° C. for 5 hrs to obtain a porous tin oxide monolith containing chromium and copper oxides.

EXAMPLE 14

Follow the procedures in example 13 except that a water solution containing 2.0 g palladium chloride ($PdCl_3$) and 100 g water is used for dipping to obtain a porous tin oxide monolith containing palladium.

EXAMPLE 15

Follow the procedures in example 2 to obtain a solution (containing the sedimented gel) with pH=4.3 and then rigorously agitate the solution so that the sedimented gel becomes uniformly suspended and the solution becames milky white. Then dip a glass plate into the agitated solution and slowly draw the glass plate out from the solution at a speed of 10 cm/min. During the drawing, a gel film is coated on both sides of the plate. Let the coated films be naturally dried at 25° C. and then heat it for 30 minutes at 100° C. and for 1 hr at 400° C. Repeat coating and heat-treating procedures 6 times to obtain porous tin oxide films.

What to be claimed are:

1. A process for preparing tin oxide monolith comprising the steps of:

a. dissolving tin chloride or its hydrate in alcohol to form an alcohol solution having a tin ion concentration ranging between 0.001 to 5.0M, and then mixing the alcohol solution with water to make a tin-alcohol-water mixture solution, wherein the molar ratio between water and tin ion ranges between 3,500:1 and 100:1;

b. settling the tin-alcohol-water mixture solution so as to allow colloid or flocculating gel to be formed and settle to the bottom of the mixture solution to become sediments;

c. removing the mixture solution above the sediments, then adding fresh water or fresh water/alcohol mixture to the sediments to thereby increase the solution pH without the use of any alkaline solution;

d. repeat steps b and c until the solution pH of the mixture solution reaches a value between 2.0 and 7.0;

e. collecting and drying the sediments to obtain a tin oxide monolith; and heat-treating the tin oxide monolith obtained from step e to obtain heat treated tin oxide monolith.

2. The process of claim 1 wherein step a also involves adding at least another metal ion, other than the tin ions, into alcohol.

3. The process of claim 2 wherein the metal ion is selected from group consisting of platinum, copper, chromium, antimony, yttrium, palladium, gold, aluminum, nickel, cesium, iron, and calcium ions.

4. The process of claim 1 wherein the heat treated tin oxide is dipped into a water or mixed alcohol/water solution containing at least one metal ion other than tin ion, followed by drying and sintering to include the at least one other-than-tin metal ion within the tin oxide monolith.

5. The process of claim 4 wherein the water or alcohol/water solution contains at least one dissolved salt selected from the group consisting of antimony chloride, chromium oxide, copper nitrate, palladium chloride, aluminum chloride, gold chloride, ferric chloride, nickel chloride, cesium chloride, and calcium chloride.

6. The process of claim 1 wherein the alcohol contains at least one alkyl alcohol.

7. The process of claim 6 wherein the alcohol is selected from the group consisting of methanol, ethanol, n-propanol, isopropyl alcohol and t-butyl alcohol.

8. The process of claim 1 wherein the molar ratio between water and tin ions ranges from 1.500:1 to 400:1.

9. The process of claim 1 wherein the tin chloride is tin tetrachloride ($SnCl_4$).

10. The process of claim 1 wherein the tin oxide monolith has a specific surface area between 180 and 250 $m^2/g$.

11. The process of claim 1 wherein the tin oxide monolith has a pore size between about 2.2 and about 4.6 nm.

12. The process of claim 1 wherein the tin oxide monolith is heat treated in step f at a temperature no higher than 400° C.

* * * * *